Jan. 1, 1952 T. NICOLA 2,580,821
SPRING IMPACTOR BONE PLATE
Filed Oct. 21, 1950
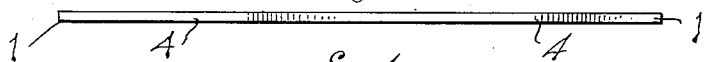
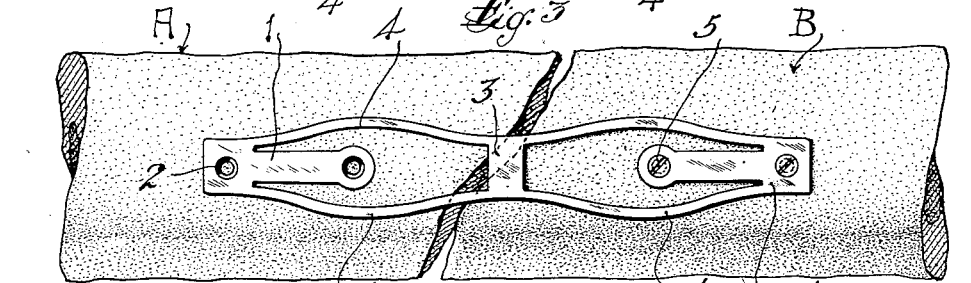
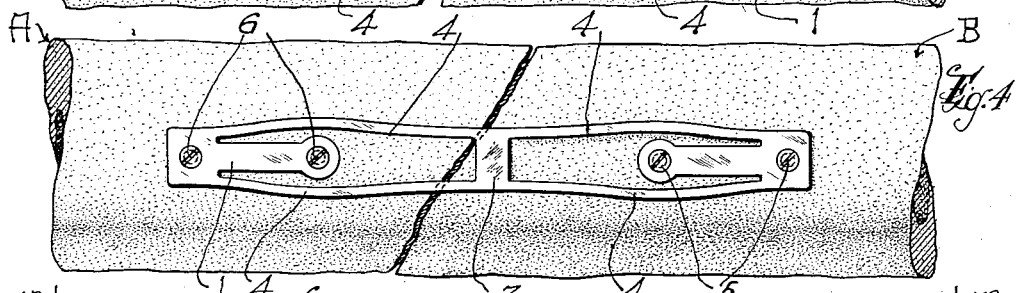
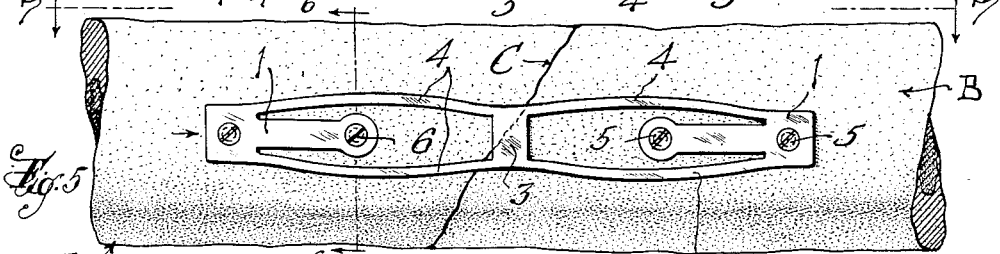
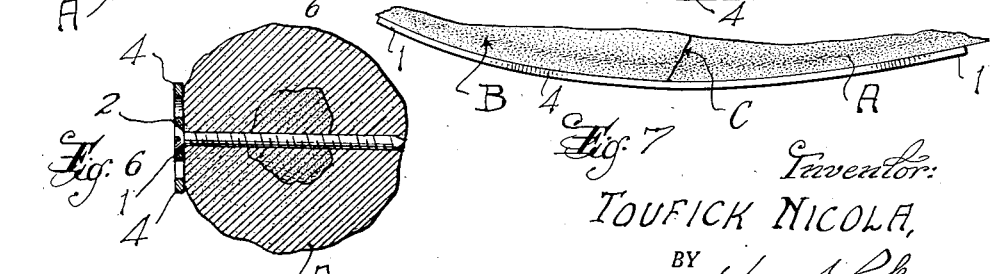
Inventor:
TOUFICK NICOLA,
BY
Attorney.

Patented Jan. 1, 1952

2,580,821

UNITED STATES PATENT OFFICE 2,580,821

SPRING IMPACTOR BONE PLATE

Toufick Nicola, Montclair, N. J.

Application October 21, 1950, Serial No. 191,452

4 Claims. (Cl. 128—92)

This invention relates in general to appliances for manipulating and holding two sections or fragments of a fractured bone in normal or proper alinement with the fractured ends of the sections in proper contact or abutting relation with each other to facilitate healing or knitting together thereof. Many types of devices for this purpose have been proposed, but most of them comprise one plate secured to both fragments in bridging relation to the fracture, or two plates that are adjustably connected together by a screw and each of which is fastened to one bone section, so that after the plates have been secured to the bone sections, the bone sections may be pulled longitudinally by adjustment of the said screw to force their juxtaposed ends into contact with each other. These known devices are unsatisfactory because shortly after the bone sections have been brought together, they begin to shrink from each other which hinders or causes imperfect healing, and it is difficult if not impossible to adjust the screw of the second-mentioned type of appliance for constantly pulling the bone sections together.

One object of the present invention is to provide a bone plate embodying novel and improved features of construction whereby forces pulling the bone fragments or sections into contact with each other can be automatically constantly applied to the bone sections during the healing of the break.

Another object is to provide a spring impactor bone plate which shall be inherently resilient and capable of maintaining a constant spring tension on the bone sections to which it is applied for holding the juxtaposed ends of the bone sections in contact with each other.

Other objects, advantages and results of the invention will be brought out by the following description in conjunction with the accompanying drawings in which Figure 1 is a side elevational view of a spring impactor bone plate embodying the invention;

Figure 2 is a top plan view thereof;

Figure 3 is a plan view of the bone plate showing the first step in the application of the plate to broken bone sections;

Figure 4 is a similar view showing the next step in securing the plate to the bone sections;

Figure 5 is a plan view of the bone plate secured to both bone sections and showing the bone sections being held in endwise contact with each other;

Figure 6 is a transverse vertical sectional view approximately on the plane of the line 6—6 of Figure 5; and Figure 7 is a side elevational view of the bone plate and portions of a curved broken bone to which the plate is applied.

Specifically describing the illustrated embodiment of the invention, the spring impactor bone plate is formed of an inherently resilient non-corrosive substance, preferably a spring alloy of stainless steel; and the plate includes two identical end portions 1 that are reversely arranged and have screw openings 2 to receive screws for connecting the plate to the sections of a broken bone that are to be connected by the plate. The plate also has a central portion 3 between which and the end portions at each of opposite edges of the plate are normally longitudinal curved sections 4 portions of which intermediate their ends are spaced different distances than their ends from the longitudinal center line of the plate. These curved sections are shown as outwardly bowed spring sections which when pressed inwardly will tend to straighten and elongate the plate.

In use of the device, assuming that it is to be connected to broken bone sections A and B for drawing and holding the juxtaposed end portions of said sections in contact with each other on the plane of cleavage C, the plate is laid on the bone sections across or in bridging relation to the broken ends as shown in Figure 3 where for the purpose of clearance the space between the bone sections is exaggerated. One end portion 1 of the plate is then secured to the corresponding bone section by screws 5. Thereupon the opposite spring sections 4 are pressed toward each other or squeezed together so as to elongate the plate as shown in Figure 4. While the spring sections are so held, screws 6 are screwed into the corresponding bone section through the holes 2 to fasten the plate to the bone. After the screws have been driven, the spring sections are released and as the opposite spring sections contract or spring outwardly or away from each other, the plate is shortened so as to pull the broken bone ends into tight contact with each other as shown in Figure 5. This spring action is continuous until the bone has healed, whereupon the screws 2 are removed to detach the plate from the bone.

The configuration of the plate may be varied as required by the shapes of the bones with which the plate is to be used, as shown in Figure 7.

It will thus be seen that my invention provides a bone plate whereby the ends of broken bone sections can be automatically and constantly held in contact with each other throughout the bone-healing operation, thereby ensuring perfect healing conditions with a minimum of attention and care of the bone surgeon and with a minimum of discomfort to the patient.

I claim:

1. For external fixation of fractured bones, a plate having end portions to be fastened to end portions of fragments of a fractured bone, and normally curved spring portions connecting said end portions.

2. For external fixation of fractured bones, a plate having end portions to be fastened to end portions of fragments of a fractured bone, a central portion, and a pair of spring portions bowed away from each other and connecting said central portion to each end portion.

3. A bone plate comprising end portions connected by longitudinal spring sections, said end portions to be fastened to end portions of fragments of a fractured bone and said spring sections having different portions intermediate their ends spaced different distances from the longitudinal center line of the plate.

4. A bone plate comprising spaced end portions to be secured respectively to the juxtaposed end portions of fractured bone fragments, a central portion and a pair of longitudinal spring sections connecting said central portion to each end portion and bowed so that intermediate portions of each spring section are spaced from the longitudinal center line of the plate a different distance than the ends of said spring section.

TOUFICK NICOLA.

REFERENCES CITED

The following references are of record in the file of this patent:

UNITED STATES PATENTS

| Number | Name | Date |
|---|---|---|
| 583,455 | Bush | June 1, 1897 |
| 2,501,978 | Wichman | Mar. 28, 1950 |

FOREIGN PATENTS

| Number | Country | Date |
|---|---|---|
| 67,552 | Norway | Mar. 13, 1944 |